(12) United States Patent
Nazarpoor

(10) Patent No.: US 9,227,177 B2
(45) Date of Patent: Jan. 5, 2016

(54) COATING PROCESS OF ZERO-PGM CATALYSTS AND METHODS THEREOF

(71) Applicant: Zahra Nazarpoor, Camarillo, CA (US)

(72) Inventor: Zahra Nazarpoor, Camarillo, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 14/183,056

(22) Filed: Feb. 18, 2014

(65) Prior Publication Data

US 2014/0274678 A1    Sep. 18, 2014

Related U.S. Application Data

(63) Continuation-in-part of application No. 13/927,850, filed on Jun. 26, 2013.

(60) Provisional application No. 61/791,721, filed on Mar. 15, 2013, provisional application No. 61/791,838, filed on Mar. 15, 2013.

(51) Int. Cl.
*B01J 23/32* (2006.01)
*B01J 23/889* (2006.01)
(Continued)

(52) U.S. Cl.
CPC .......... *B01J 23/8892* (2013.01); *B01D 53/945* (2013.01); *B01J 23/005* (2013.01);
(Continued)

(58) Field of Classification Search
CPC .................................................. B01J 23/8892
USPC ........................................ 502/324; 423/599
See application file for complete search history.

(56) References Cited

U.S. PATENT DOCUMENTS 3,284,370 A   11/1966   Alan et al.
4,062,810 A   12/1977   Vogt et al.
(Continued)

FOREIGN PATENT DOCUMENTS

CH         644637 A5    8/1984
CN        102172527    9/2011
(Continued)

OTHER PUBLICATIONS

K. S. Abdel Halim et al. "Catalytic Oxidation of CO Gas over Nanocrystallite CuxMn1-xFe2O4", Feb. 26, 2008, Top Catalyst (2008) 47:66-72.
(Continued)

*Primary Examiner* — Colleen Dunn
*Assistant Examiner* — Haytham Soliman
(74) *Attorney, Agent, or Firm* — Barnes & Thornburg LLP; Edward F. Behm, Jr.; Thomas J. McWilliams

(57) ABSTRACT

Variations of coating processes of ZPGM catalyst materials for TWC applications are disclosed. The disclosed coating processes for ZPGM materials are enabled in the preparation of ZPGM catalyst samples according to a plurality of catalyst configurations, which may include washcoat and an overcoat layer with or without an impregnation layer, including Cu—Mn spinel and doped Zirconia support oxide, prepared according to variations of disclosed coating processes. Activity measurements under isothermal steady state sweep test condition are considered under lean condition and rich condition close to stoichiometric condition to analyze the influence of disclosed coating processes on TWC performance of ZPGM catalysts. Different coating processes may substantially increase TWC activity, providing improved levels of NO, CO, and HC conversions and cost effective manufacturing solutions.

19 Claims, 7 Drawing Sheets

(51) Int. Cl.
  *B01J 37/03* (2006.01)
  *B01J 23/00* (2006.01)
  *B01D 53/94* (2006.01)

(52) U.S. Cl.
  CPC ............ *B01J 37/035* (2013.01); *B01J 37/038* (2013.01); *B01D 2255/207* (2013.01); *B01D 2255/2073* (2013.01); *B01D 2255/20715* (2013.01); *B01D 2255/20761* (2013.01); *B01D 2255/405* (2013.01); *B01D 2255/65* (2013.01); *B01D 2255/9022* (2013.01); *B01D 2255/9025* (2013.01); *B01J 2523/00* (2013.01)

(56) References Cited

U.S. PATENT DOCUMENTS

| | | |
|---|---|---|
| 4,274,981 A | 6/1981 | Suzuki et al. |
| 4,297,150 A | 10/1981 | Sims et al. |
| 4,414,023 A | 11/1983 | Aggen et al. |
| 4,661,329 A | 4/1987 | Suzuki et al. |
| 4,673,556 A | 6/1987 | McCabe et al. |
| 4,797,329 A | 1/1989 | Kilbane et al. |
| 4,885,269 A | 12/1989 | Cyron |
| 5,063,193 A | 11/1991 | Bedford et al. |
| 5,162,284 A | 11/1992 | Soled et al. |
| 5,238,898 A | 8/1993 | Han et al. |
| 5,364,517 A | 11/1994 | Dieckmann et al. |
| 5,371,056 A | 12/1994 | Leyrer et al. |
| 5,580,553 A | 12/1996 | Nakajima |
| 5,658,543 A | 8/1997 | Yoshida et al. |
| 5,747,410 A | 5/1998 | Muramatsu et al. |
| 6,129,834 A | 10/2000 | Peters et al. |
| 6,395,244 B1 | 5/2002 | Hartweg et al. |
| 6,576,587 B2 | 6/2003 | Labarge et al. |
| 6,624,113 B2 | 9/2003 | Labarge et al. |
| 6,696,389 B1 | 2/2004 | Boegner et al. |
| 6,774,080 B2 | 8/2004 | LaBarge et al. |
| 6,938,411 B2 | 9/2005 | Hoffmann et al. |
| 7,129,194 B2 | 10/2006 | Baca et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,803,338 B2 | 9/2010 | Socha et al. |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,845,987 B1 | 9/2014 | Nazarpoor et al. |
| 8,853,121 B1 | 10/2014 | Nazarpoor et al. |
| 8,858,903 B2 | 10/2014 | Nazarpoor |
| 8,969,228 B2 | 3/2015 | Nazarpoor et al. |
| 2002/0042341 A1 | 4/2002 | Golden |
| 2003/0092566 A1 | 5/2003 | Inoue et al. |
| 2004/0151647 A1 | 8/2004 | Wanninger et al. |
| 2006/0120936 A1 | 6/2006 | Alive et al. |
| 2006/0292342 A1 | 12/2006 | Ohno et al. |
| 2008/0125308 A1 | 5/2008 | Fujdala et al. |
| 2009/0220697 A1 | 9/2009 | Addiego |
| 2009/0274903 A1 | 11/2009 | Addiego |
| 2009/0324468 A1* | 12/2009 | Golden et al. ............... 423/210 |
| 2009/0324469 A1 | 12/2009 | Golden et al. |
| 2009/0324470 A1 | 12/2009 | Alamdari et al. |
| 2010/0062293 A1 | 3/2010 | Triantaflyllopoulos et al. |
| 2010/0081563 A1 | 4/2010 | Edgar-Beltran et al. |
| 2010/0152032 A1 | 6/2010 | Galligan |
| 2010/0168449 A1 | 7/2010 | Grey et al. |
| 2010/0184590 A1 | 7/2010 | Althofer et al. |
| 2010/0240525 A1 | 9/2010 | Golden et al. |
| 2010/0266473 A1 | 10/2010 | Chen et al. |
| 2010/0293929 A1 | 11/2010 | Zhan et al. |
| 2012/0015801 A1 | 1/2012 | Deprez et al. |
| 2013/0115144 A1 | 5/2013 | Golden et al. |
| 2013/0172177 A1 | 7/2013 | Domke et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0301909 A1 | 10/2014 | Nazarpoor |
| 2014/0301931 A1 | 10/2014 | Nazarpoor |
| 2014/0302983 A1 | 10/2014 | Nazarpoor |
| 2014/0334989 A1 | 11/2014 | Nazarpoor et al. |
| 2014/0334990 A1 | 11/2014 | Nazarpoor |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2015/0005157 A1 | 1/2015 | Nazarpoor et al. |
| 2015/0005158 A1 | 1/2015 | Nazarpoor et al. |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |

FOREIGN PATENT DOCUMENTS

| | | |
|---|---|---|
| EP | 0022349 | 1/1981 |
| EP | 0450987 | 10/1991 |
| EP | 0605142 | 7/1994 |
| EP | 1 256 382 | 11/2002 |
| JP | 62-20613 | 1/1987 |
| JP | 4-215853 | 8/1992 |
| WO | WO 2013004814 | 1/2013 |
| WO | WO 2013068243 | 5/2013 |
| WO | WO 2013121112 | 8/2013 |
| WO | WO 2013121112 A1 | 8/2013 |
| WO | WO 2013153081 | 10/2013 |
| WO | WO 2013153081 A1 | 10/2013 |

OTHER PUBLICATIONS

D. Panayotov, "Interaction Between NO, CO and 02 on gamma-Al2O3-Supported Copper—Manganese Oxides", 1996, React.Kinet. Catal.Lett. vol. 58, No. 1, 73-78.

Tanaka et al., "Influence of preparation method and additive for Cu—Mn spinel oxide catalyst on water gas shift reaction of reformed fuels", Applied Catalysis A: General 279 (2005) 59-66.

Papavasilious et al., "Combined Steam reforming of methanol over Cu—Mn spinel oxide catalysts", Journal of Catalysis 251 (2007) 7-20.

(56) References Cited

OTHER PUBLICATIONS

Mestres et al., Phase Diagram at Low Temperature of the System Zr02/Nb205, Z.Znorg. Alig. Chem., 2001, 627, 294-298.
Non-Final Office Action for U.S. Appl. No. 13/849,169 issued Mar. 6, 2014.
Hayes et al., "Introduction to Catalytic Combustion", pp. 310-313, 1997 OPA (Overseas Publishers Association).
Azad et al., "Examining the Cu—Mn—O Spinel System as an Oxygen Carrier in Chemical Looping Combustion," Journal of Energy Technology, 2013, vol. 1, 59-69.
Reddy et al., "Selective Ortho-Methylation of Phenol with Methanol over Copper Manganese Mixed-Oxide Spinel Catalysts," Journal of Catalysis, 2006, vol. 243, 278-291.

* cited by examiner

COATING PROCESS OF ZERO-PGM CATALYSTS AND METHODS THEREOF

CROSS-REFERENCE TO RELATED APPLICATIONS

This application is a continuation-in-part of U.S. patent application Ser. No. 13/927,850, filed Jun. 26, 2013, respectively, and claims priority to U.S. Provisional Application Nos. 61/791,721 and 61/791,838, filed Mar. 15, 2013, respectively, and is related to U.S. patent application Ser. No. 14/090,861, filed Nov. 26, 2013, entitled System and Methods for Using Synergized PGM as a Three-Way Catalyst, which are incorporated herein by reference as if set forth in their entirety.

BACKGROUND

1. Field of the Disclosure

This disclosure relates generally to catalyst materials and, more particularly, to the influence of a plurality of coating processes on performance of Zero-PGM (ZPGM) three-way catalyst (TWC) applications.

2. Background Information

The emissions present in the exhaust gas of a motor vehicle can be divided into primary and secondary emissions. Primary emission refers to pollutant gases which form directly through the combustion process of the fuel in the engine and are already present in the untreated emission before it passes through an exhaust gas treatment system. Secondary emission refers to those pollutant gases which can form as by-products in the exhaust gas treatment system.

Compliance with the emissions limits prescribed by worldwide legislation requires nitrogen oxide removal from the exhaust gas, although carbon monoxide and hydrocarbon pollutant gases from the lean exhaust gas can easily be rendered harmless by oxidation over a suitable catalyst, the reduction of the nitrogen oxides to nitrogen is much more difficult owing to the high oxygen content of the exhaust gas stream.

Catalysts attributes of activity, stability, selectivity, and regenerability in long-term service can be related to the physical and chemical properties of the catalyst materials, which in turn can be related to the method of preparation of the catalyst. The slurry characteristics of materials used are influential to the coating properties, which can be achieved by using different coating processes. A process for coating of sufficient loading may provide improved active sites for catalytic performance. As an ineffectual coating technique may result in heterogeneity of the applied coating, the preparation path for coatings may show critical factors which can influence the coating quality and catalytic performance.

Current three-way catalyst (TWC) systems include a support of alumina upon which both platinum group metals (PGM) material and promoting oxides are deposited. Key to the desired catalytic conversions is the structure-reactivity interplay between the promoting oxide and the PGM metals, in particular regarding the storage/release of oxygen under process conditions, but a set of characteristic variables drive up PGM cost, i.e., small market circulation volume, constant fluctuations in price, and constant risk to stable supply, amongst others.

According to the foregoing reasons, there may be a need to provide material compositions for PGM-free catalyst systems which may be manufactured cost-effectively, such that catalytic performance may be improved for a minimum loading, employing coating processes leading to the realization of suitable PGM-free catalytic layers in catalysts that can be used in a variety of environments and TWC applications.

SUMMARY

As three-way catalyst (TWC) systems may vary in a number of ways using cooperative effects derived from tools of catalyst design and synthesis methods, it may be desirable to enable catalyst systems that may include materials of significant importance as elements for the advancement of TWC technology, and to effect emission reduction across a range of temperature and operating conditions, while maintaining or even improving upon the thermal and chemical stability under normal operating conditions in TWC applications.

The present disclosure may provide coating processes for a plurality of Zero-PGM (ZPGM) catalysts which may include Cu—Mn stoichiometric spinel on support oxide to determine the influence of coating processes on TWC performance.

According to embodiments in present disclosure, a ZPGM catalyst may include a substrate, a washcoat (WC) layer, an overcoat (OC) layer, and/or an impregnation layer. A suitable synthesis method may be used for a plurality of coating processes to configure a ZPGM catalyst in which WC layer may be an alumina-based washcoat coated on suitable substrate. OC layer may include $Cu_{1.0}Mn_{2.0}O_4$ spinel and doped Zirconia support oxide, which may be subsequently coated on the alumina-based WC layer. In present disclosure, Niobium-Zirconia support oxide may be used in OC layer of ZPGM catalyst samples.

According to embodiments in present disclosure, co-precipitation technique may be used for coating Cu—Mn spinel on doped Zirconia support oxide to prepare ZPGM catalyst samples in which WC layer may be an alumina-based washcoat. OC slurry may be made from powder of $Cu_{1.0}Mn_{2.0}O_4$ spinel on doped Zirconia, and subsequently coated on alumina-based WC layer; or OC slurry may include powder of $Cu_{1.0}Mn_{2.0}O_4$ spinel which may be milled with doped Zirconia support oxide for coating on alumina-based WC layer; or OC layer of doped Zirconia support oxide for coating on alumina-based WC layer and an impregnation (IMP) layer including $Cu_{1.0}Mn_{2.0}O_4$ spinel. In present disclosure the doped Zirconia support oxide material may be Niobium-Zirconia support oxide.

Disclosed coating processes may be verified preparing fresh samples for each of the catalyst formulations and configurations, objects of present disclosure, to determine the influence of the plurality of coating processes on TWC performance of ZPGM catalysts.

The NO/CO cross over R-value of prepared ZPGM catalyst samples, per coating processes employed in present disclosure, may be determined and compared by performing isothermal steady state sweep test. The isothermal steady state sweep test may be carried out at a selected inlet temperature using an 11-point R-value from rich condition to lean condition at a plurality of space velocities. Results from isothermal steady state test may be compared to show the influence that a coating process may have on TWC performance of the ZPGM catalysts at a selected R-value condition.

The TWC property that may result from the plurality of coating processes may indicate that for catalyst applications, and, more particularly, for ZPGM catalysts operating under lean condition or rich condition close to stoichiometric condition, the chemical composition of the catalyst may be more efficient operationally-wise, and from a catalyst manufacturer's viewpoint, an essential advantage given the economic factors involved when substantially PGM-free materials may be used to manufacture ZPGM catalysts for a plurality of TWC applications.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
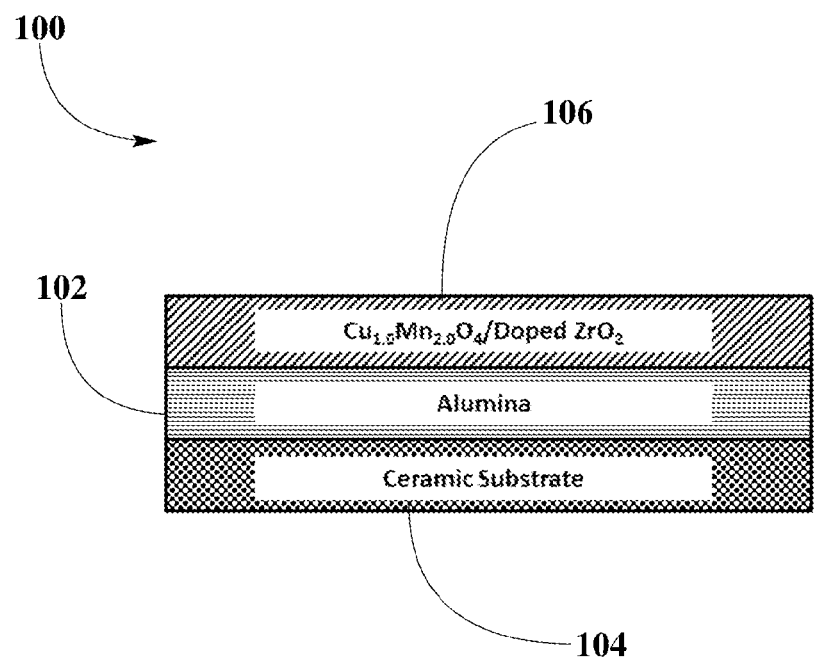
FIG. 1 shows a catalyst configuration for ZPGM catalyst samples prepared using coating processes referred as coating process Type 1, coating process Type 2, and coating process Type 3, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group Metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat or impregnation layer.

"Milling" refers to the operation of breaking a solid material into a desired grain or particle size.

"Co-precipitation" refers to the carrying down by a precipitate of substances normally soluble under the conditions employed.

"Impregnation" refers to the process of imbuing or saturating a solid layer with a liquid compound or the diffusion of some element through a medium or substance.

"Calcination" refers to a thermal treatment process applied to solid materials, in presence of air, to bring about a thermal decomposition, phase transition, or removal of a volatile fraction at temperatures below the melting point of the solid materials.

"Treating, treated, or treatment" refers to drying, firing, heating, evaporating, calcining, or mixtures thereof.

"Spinel" refers to any of various mineral oxides of magnesium, iron, zinc, or manganese in combination with aluminum, chromium, copper or iron with $AB_2O_4$ structure.

"Conversion" refers to the chemical alteration of at least one material into one or more other materials.

"R-value" refers to the number obtained by dividing the reducing potential by the oxidizing potential of materials in a catalyst.

"Rich condition" refers to exhaust gas condition with an R-value above 1.

"Lean condition" refers to exhaust gas condition with an R-value below 1.

"Air/Fuel ratio" or A/F ratio" refers to the weight of air divided by the weight of fuel.

"Three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

DESCRIPTION OF THE DRAWINGS

The present disclosure may provide material compositions including Cu—Mn spinel on support oxide and coating processes to develop suitable catalytic layers, which may ensure the identification of a coating process, capable of providing high chemical reactivity and mechanical stability for ZPGM catalysts. The diversified aspects that may be treated in present disclosure may show improvements in the process for overall catalytic conversion capacity or recombination rates for a plurality of ZPGM catalysts which may be suitable for TWC applications.

Catalyst Material Composition, Preparation, and Configuration

As catalyst performance parameters may be translated into the physical catalyst structure, different coating methods may be used to achieve desired coating properties and effective level of catalytic performance.

FIG. 1 shows catalyst configuration 100 for which co-precipitation technique may be used for coating Cu—Mn spinel on doped Zirconia support oxide to prepare ZPGM catalyst samples. Accordingly, in this configuration, washcoat (WC) layer 102 may be alumina only, coated on suitable ceramic substrate 104. Overcoat (OC) layer 106 may be $Cu_{1.0}Mn_{2.0}O_4$ spinel co-precipitated on doped Zirconia support oxide slurry, and subsequently coated on alumina-based WC layer 102.

Catalyst configuration 100 may be also employed for coating of Cu—Mn spinel as powder to prepare ZPGM catalyst samples. Accordingly, in this configuration, WC layer 102 may be alumina-based washcoat, coated on suitable ceramic substrate 104. OC layer 106 may include $Cu_{1.0}Mn_{2.0}O_4$ spinel bulk powder which may be prepared separately and subsequently added to milled doped Zirconia support oxide for coating on alumina-based WC layer 102; or OC layer 106 may include bulk powder of $Cu_{1.0}Mn_{2.0}O_4$ spinel with doped Zirconia support oxide, milled and coated on alumina-based WC layer 102. In present disclosure, Niobium-Zirconia support oxide may be used as support oxide in catalyst configuration 100.

Figure 2:
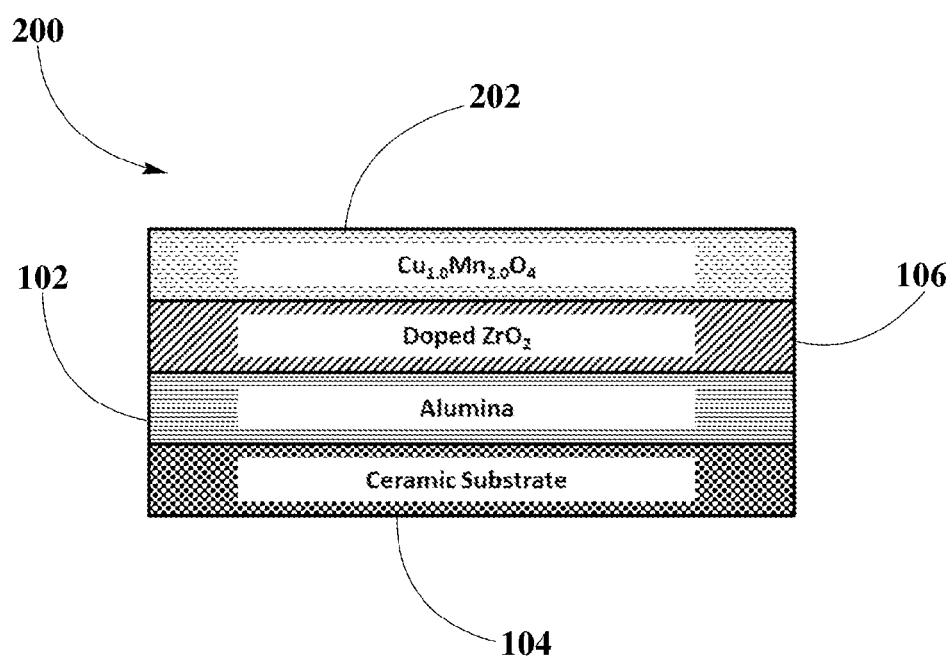
FIG. 2 shows a catalyst configuration for ZPGM catalyst samples prepared using coating process referred as coating process Type 4, according to an embodiment.

FIG. 2 depicts catalyst configuration 200 which may be used for coating Cu—Mn spinel on doped Zirconia support oxide to prepare ZPGM catalyst samples. In this configuration, WC layer 102 may be alumina only, coated on suitable ceramic substrate 104. Impregnation (IMP) layer 202 including $Cu_{1.0}Mn_{2.0}O_4$ spinel may be added to OC layer 106 of doped Zirconia support oxide. In present disclosure, Niobium-Zirconia support oxide may be used as support oxide in catalyst configuration 200.

Coating properties and catalytic performance, that may derive from each one of disclosed coating processes, may be verified under isothermal steady state sweep condition. In present disclosure, NO/CO cross over R-value of prepared fresh ZPGM catalyst samples may be determined and compared by performing isothermal steady state sweep test.

Isothermal Steady State Sweep Test Procedure

The isothermal steady state sweep test may be carried out employing a flow reactor at inlet temperature of about 450° C., and testing a gas stream at 11-point R-values from about 2.00 (rich condition) to about 0.80 (lean condition) to measure the CO, NO, and HC conversions.

The space velocity (SV) in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, about 10% of $CO_2$, and about 10% of $H_2O$. The quantity of $O_2$ in the gas mix may be varied to adjust Air/Fuel (A/F) ratio within the range of R-values to test the gas stream.

The following examples are intended to illustrate the scope of the disclosure. It is to be understood that other procedures known to those skilled in the art may alternatively be used.

EXAMPLES

Example #1

Coating Process Type 1, Co-Precipitation of Cu—Mn Spinel/$Nb_2O_5$—$ZrO_2$ Support Oxide Example #1 may illustrate preparation of ZPGM catalyst samples of catalyst configuration 100 employing coating process here referred as coating process Type 1. Co-precipitation method may be employed in this process. Preparation of WC layer 102 may start by milling alumina solution to make slurry. Suitable loading of alumina may be about 120 g/L. Alumina slurry may be subsequently coated on ceramic substrate 104 and fired (calcined) at about 550° C. for about 4 hours. Preparation of OC layer 106 may start by milling $Nb_2O_5$—$ZrO_2$ support oxide with water separately to make slurry. Then, Cu—Mn solution may be prepared by mixing the appropriate amount of Mn nitrate solution ($Mn(NO_3)_2$) and Cu nitrate solution ($CuNO_3$) with water to make solution at appropriate molar ratio for $Cu_{1.0}Mn_{2.0}O_4$, according to formulation $Cu_xMn_{3-x}O_4$, in which X may take value of 1.0. Subsequently, Cu—Mn solution may be mixed with slurry of $Nb_2O_5$—$ZrO_2$ support oxide for about 2 hours to 4 hours, followed by precipitation with an appropriate amount of base solution to adjust pH at desired level. Suitable loading for OC layer 106 may be about 120 g/L. Then, slurry of Cu—Mn solution and $Nb_2O_5$—$ZrO_2$ support oxide may be coated on top of WC layer 102 and fired at about 600° C. for about 5 hours.

The NO/CO cross over R-value of prepared fresh ZPGM catalyst samples, per coating process Type 1, may be determined by performing isothermal steady state sweep test at inlet temperature of about 450° C., and testing a gas stream at 11-point R-values from about 2.00 (rich condition) to about 0.80 (lean condition) to measure the CO, NO, and HC conversions.

Figure 3:
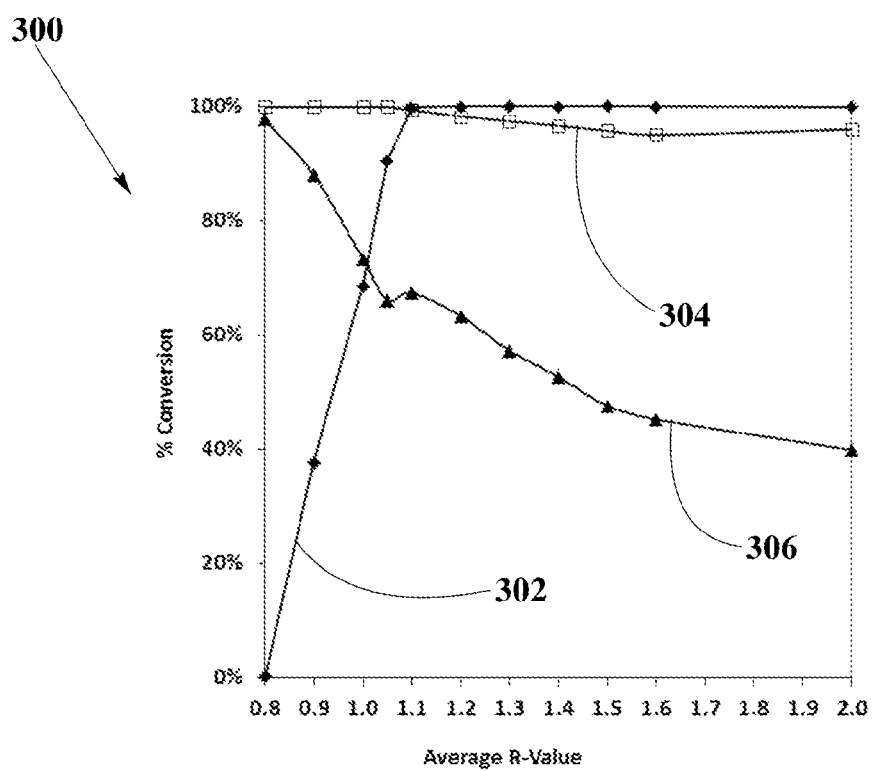
FIG. 3 shows catalyst performance for fresh ZPGM catalyst samples prepared using coating process Type 1, under isothermal steady state sweep condition, at inlet temperature of about 450° C. and space velocity (SV) of about 40,000 $h^{-1}$, according to an embodiment.

FIG. 3 shows catalyst performance 300 for fresh ZPGM catalyst samples prepared using coating process Type 1, under isothermal steady state sweep condition, at inlet temperature of about 450° C. and SV of about 40,000 $h^{-1}$, according to an embodiment.

In FIG. 3, conversion curve 302, conversion curve 304, and conversion curve 306 show isothermal steady state sweep test results for NO conversion, CO conversion, and HC conversion, respectively.

As may be seen in FIG. 3, for fresh ZPGM catalyst samples, NO/CO cross over takes place at the specific R-value of 1.10, close to stoichiometric condition, where $NO_X$ and CO conversions are about 99.3%, respectively. Results from isothermal steady state sweep test for fresh ZPGM catalyst samples prepared per coating process Type 1 reveal a significant high activity, specially for NO and CO.

Example #2

Coating Process Type 2, Cu—Mn Spinel Bulk Powder/$Nb_2O_5$—$ZrO_2$ Support Oxide Example #2 may illustrate preparation of ZPGM catalyst samples of catalyst configuration 100 employing coating process here referred as coating process Type 2. Preparation of WC layer 102 may start by milling alumina solution to make slurry. Suitable loading of alumina may be about 120 g/L. Alumina slurry may be subsequently coated on ceramic substrate 104 and fired at about 550° C. for about 4 hours. Preparation of OC layer 106 may start by milling $Nb_2O_5$—$ZrO_2$ support oxide with water separately to make slurry. Then, Cu—Mn solution may be prepared by mixing the appropriate amount of Mn nitrate solution ($Mn(NO_3)_2$) and Cu nitrate solution ($CuNO_3$) with water to make solution at appropriate molar ratio for $Cu_{1.0}Mn_{2.0}O_4$, according to formulation $Cu_xMn_{3-x}O_4$, in which X may take value of 1.0. Subsequently, Cu—Mn solution may be precipitated using an appropriate amount of base solution to adjust pH of slurry at desired level. Then, slurry may undergo filtering and washing with distilled water, followed by drying, and subsequently, calcination at selected temperature of about 600° C. for about 5 hours to prepare fine grain powder of $Cu_{1.0}Mn_{2.0}O_4$ spinel. Cu—Mn spinel powder may then be mixed with slurry of $Nb_2O_5$—$ZrO_2$ support oxide for about 2 hours to 4 hours.

Then, slurry of Cu—Mn solution and $Nb_2O_5$—$ZrO_2$ support oxide may be coated on top of WC layer 102 and fired at about 600° C. for about 5 hours. Suitable loading for OC layer 106 may be about 120 g/L.

The NO/CO cross over R-value of prepared fresh ZPGM catalyst samples, per coating process Type 2, may be determined by performing isothermal steady state sweep test at inlet temperature of about 450° C., and testing a gas stream at 11-point R-values from about 2.00 (rich condition) to about 0.80 (lean condition) to measure the CO, NO, and HC conversions.

Figure 4:
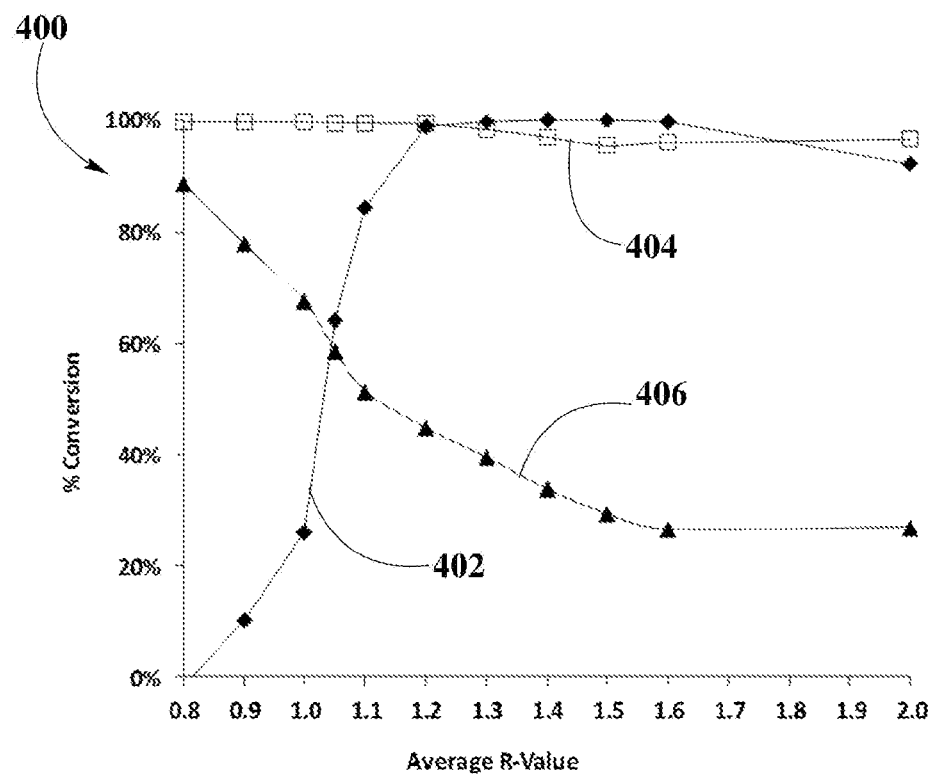
FIG. 4 depicts catalyst performance for fresh ZPGM catalyst samples prepared using coating process Type 2, under isothermal steady state sweep condition, at inlet temperature of about 450° C. and SV of about 40,000 $h^{-1}$, according to an embodiment.

FIG. 4 depicts catalyst performance 400 for fresh ZPGM catalyst samples prepared using coating process Type 2, under isothermal steady state sweep condition, at inlet temperature of about 450° C. and SV of about 40,000 $h^{-1}$, according to an embodiment.

In FIG. 4, conversion curve 402, conversion curve 404, and conversion curve 406 depict isothermal steady state sweep test results for NO conversion, CO conversion, and HC conversion, respectively.

As may be seen in FIG. 4, for fresh ZPGM catalyst samples, NO/CO cross over takes place at the specific R-value of 1.23, where $NO_X$ and CO conversions are about 99.5%, respectively.

At R-value of 1.10, $NO_X$ conversion is about 84.4%, which indicates a reduction in catalyst activity when compared with activity, at same R-value of 1.10, for fresh ZPGM catalyst samples per coating process Type 1, where $NO_X$ conversion observed is about 99.3%. Comparison of $NO_X$ conversions may indicate that the observed reduction in $NO_X$ conversion for ZPGM catalyst samples prepared using coating process Type 2 may be related to the level of dispersion of Cu—Mn spinel on support oxide. The observed reduction in $NO_X$ conversion may verify different influence on activity of ZPGM catalyst samples prepared per coating process Type 1 and coating process Type 2.

Example #3

Coating Process Type 3, Cu—Mn Spinel/$Nb_2O_5$—$ZrO_2$ Bulk Powder

Example #3 may illustrate preparation of ZPGM catalyst samples of catalyst configuration 100 employing coating process here referred as coating process Type 3. Preparation of WC layer 102 may start by milling alumina solution to make slurry. Suitable loading of alumina may be about 120 g/L. Alumina slurry may be subsequently coated on ceramic substrate 104 and calcined (fired) at about 550° C. for about 4 hours. Preparation of OC layer 106 may start by milling $Nb_2O_5$—$ZrO_2$ support oxide with water separately to make slurry. Then, Cu—Mn solution may be prepared by mixing the appropriate amount of Mn nitrate solution ($Mn(NO_3)_2$) and Cu nitrate solution ($CuNO_3$) with water to make solution at appropriate molar ratio for $Cu_{1.0}Mn_{2.0}O_4$, according to formulation $Cu_XMn_{3-X}O_4$, in which X may take value of 1.0. Then, Cu—Mn solution may be mixed with slurry of $Nb_2O_5$—$ZrO_2$ support oxide for about 2 hours to 4 hours. Subsequently, slurry of Cu—Mn/$Nb_2O_5$—$ZrO_2$ support oxide may be precipitated using an appropriate amount of base solution to adjust pH of slurry at desired level. Then, slurry of $Cu_{1.0}Mn_{2.0}O_4$ and $Nb_2O_5$—$ZrO_2$ support oxide may undergo filtering and washing with distilled water, followed by drying overnight, and subsequently, calcined at selected temperature of about 600° C. for about 5 hours to prepare fine grain powder of $Cu_{1.0}Mn_{2.0}O_4$ spinel/$Nb_2O_5$—$ZrO_2$. The Cu—Mn spinel/$Nb_2O_5$—$ZrO_2$ powder may then be milled with water separately to make slurry. Then, slurry of Cu—Mn solution and $Nb_2O_5$—$ZrO_2$ support oxide may be coated on top of WC layer 102 and fired at about 600° C. for about 5 hours. Suitable loading for OC layer 106 may be about 120 g/L.

The NO/CO cross over R-value of prepared fresh ZPGM catalyst samples, per coating process Type 3, may be determined by performing isothermal steady state sweep test at inlet temperature of about 450° C., and testing a gas stream at 11-point R-values from about 2.00 (rich condition) to about 0.80 (lean condition) to measure the CO, NO, and HC conversions.

Figure 5:
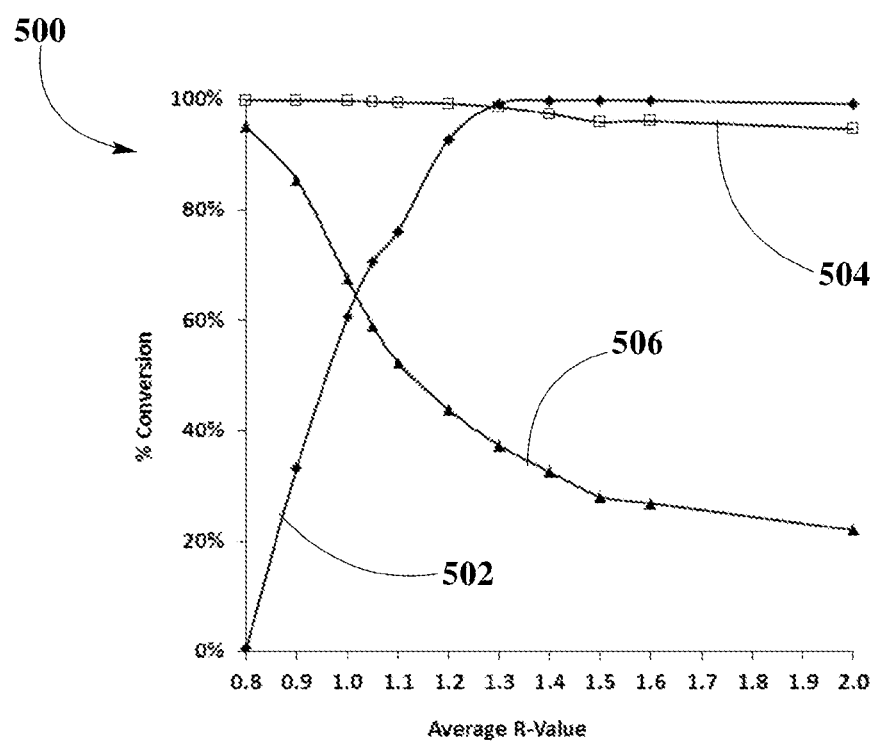
FIG. 5 depicts catalyst performance for fresh ZPGM catalyst samples prepared using coating process Type 3, under isothermal steady state sweep condition, at inlet temperature of about 450° C. and SV of about 40,000 $h^{-1}$, according to an embodiment.

FIG. 5 depicts catalyst performance 500 for fresh ZPGM catalyst samples prepared using coating process Type 3, under isothermal steady state sweep condition, at inlet temperature of about 450° C. and SV of about 40,000 $h^{-1}$, according to an embodiment.

In FIG. 5, conversion curve 502, conversion curve 504, and conversion curve 506 depict isothermal steady state sweep test results for NO conversion, CO conversion, and HC conversion, respectively.

As may be seen in FIG. 5, for fresh ZPGM catalyst samples, NO/CO cross over takes place at the specific R-value of 1.29, where $NO_X$ and CO conversions are about 98.6%, respectively.

At R-value of 1.1, $NO_X$ conversion is about 76.2%, which indicates a reduction in catalyst activity when compared with activity, at same R-value of 1.10, for fresh ZPGM catalyst samples per coating process Type 1 and coating process Type 2, where $NO_X$ conversion observed is 99.3% and 84.4%, respectively. Comparison of $NO_X$ conversions may indicate that the observed reduction in $NO_X$ conversion, for fresh ZPGM catalyst samples prepared using coating process Type 3, verifies the significant influence on TWC performance for fresh ZPGM catalyst samples prepared per coating process Type 1, even though fresh ZPGM catalyst samples prepared per coating process Type 2 and coating process Type 3 may still have characteristics of viable catalysts.

Example #4

Coating Process Type 4, IMP of Cu—Mn Spinel on $Nb_2O_5$—$ZrO_2$ Support Oxide

Example #4 may illustrate preparation of ZPGM catalyst samples of catalyst configuration 200 employing coating process here referred as coating process Type 4. Preparation of WC layer 102 may start by milling alumina solution to make slurry. Suitable loading of alumina may be about 120 g/L. Alumina slurry may be subsequently coated on ceramic substrate 104 and fired at about 550° C. for about 4 hours. Preparation of OC layer 106 may start by milling $Nb_2O_5$—$ZrO_2$ support oxide with water separately to make slurry. Slurry of $Nb_2O_5$—$ZrO_2$ support oxide may then be coated on WC layer 102 and calcined at about 550° C. for about 4 hours. Suitable loading for OC layer 106 may be about 120 g/L. Subsequently an IMP layer 202 of Cu—Mn spinel may be prepared. Accordingly, a Cu—Mn solution may be prepared by mixing the appropriate amount of Mn nitrate solution ($Mn(NO_3)_2$) and Cu nitrate solution ($CuNO_3$) to make solution at appropriate molar ratio for $Cu_{1.0}Mn_{2.0}O_4$, according to formulation $Cu_XMn_{3-X}O_4$, in which X may take value of 1.0. Then, Cu—Mn spinel solution may be impregnated on OC layer 106 of $Nb_2O_5$—$ZrO_2$ support oxide and fired at about 600° C. for about 5 hours.

The NO/CO cross over R-value of prepared fresh ZPGM catalyst samples, per coating process Type 4, may be determined by performing isothermal steady state sweep test at inlet temperature of about 450° C., and testing a gas stream at 11-point R-values from about 2.00 (rich condition) to about 0.80 (lean condition) to measure the CO, NO, and HC conversions.

Figure 6:
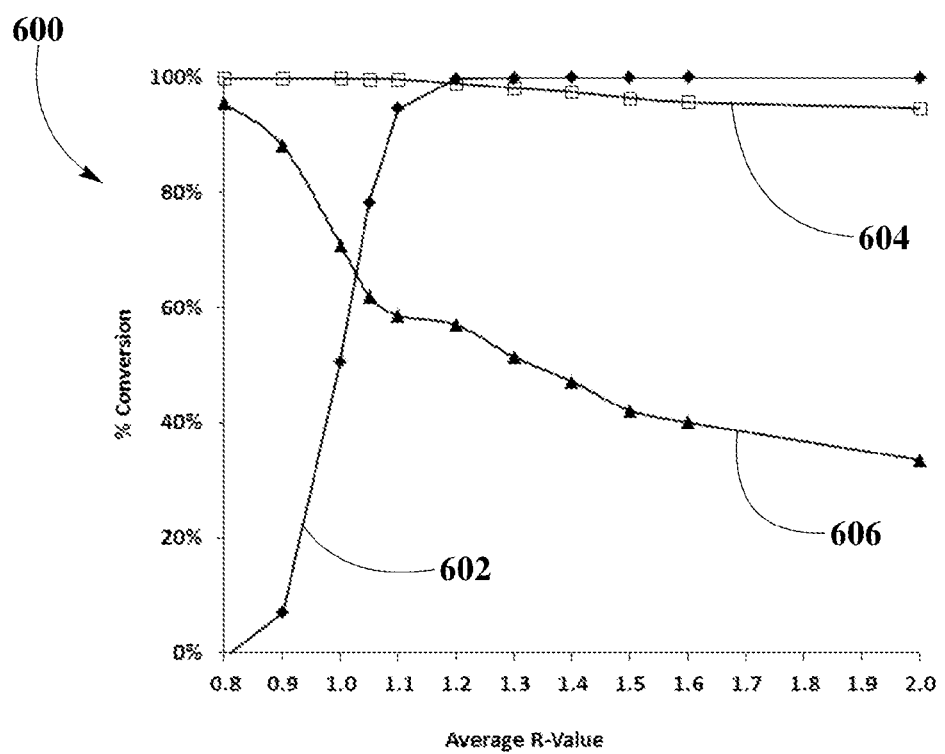
FIG. 6 illustrates catalyst performance for fresh ZPGM catalyst samples prepared using coating process Type 4, under isothermal steady state sweep condition, at inlet temperature of about 450° C. and SV of about 40,000 $h^{-1}$, according to an embodiment.

FIG. 6 illustrates catalyst performance 600 for fresh ZPGM catalyst samples prepared using coating process Type 4, under isothermal steady state sweep condition, at inlet temperature of about 450° C. and SV of about 40,000 $h^{-1}$, according to an embodiment.

In FIG. 6, conversion curve 602, conversion curve 604, and conversion curve 606 illustrate isothermal steady state sweep test results for NO conversion, CO conversion, and HC conversion, respectively.

As may be seen in FIG. 6, for fresh ZPGM catalyst samples, NO/CO cross over takes place at the specific R-value of 1.19, where $NO_X$ and CO conversions are about 98.9%, respectively. At R-value of 1.10, $NO_X$ conversion is about 94.6%, which indicates a slight reduction in catalyst activity when compared with activity, at same R-value of 1.10, for fresh ZPGM catalyst samples per coating process Type 1, where $NO_X$ conversion observed is about 99.3%.

Dependency of $NO_X$ Conversion on Type of Coating Process

Figure 7:
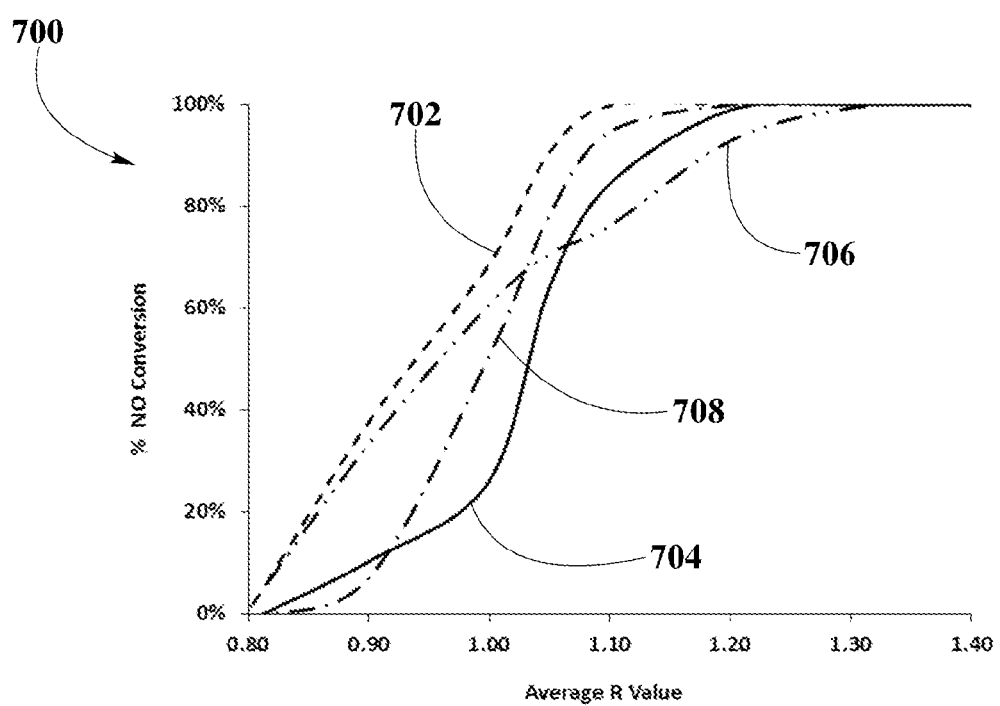
FIG. 7 illustrates NOx conversion comparison for fresh ZPGM catalyst samples prepared using coating processes Type 1, Type 2, Type 3, and Type 4, according to an embodiment.

FIG. 7 illustrates NOx conversion comparison 700 for fresh ZPGM catalyst samples prepared using coating processes Type 1, Type 2, Type 3, and Type 4, according to an embodiment.

In FIG. 7, NO conversion curve 702 (dashed line), NO conversion curve 704 (solid line), NO conversion curve 706 (double dot dashed line), and NO conversion curve 708 (single dot dashed line) respectively illustrate NO conversion results from isothermal steady state sweep test performed at inlet temperature of about 450° C. and SV of about 40,000 $h^{-1}$ for fresh ZPGM catalyst samples prepared per coating processes Type 1, Type 2, Type 3, and Type 4.

As may be observed in FIG. 7, the comparison of $NO_X$ conversion levels, under a range of rich condition to lean condition, verifies that ZPGM catalyst samples prepared per coating process Type 1 may exhibit higher level of activity than that of for other ZPGM catalyst samples prepared using coating processes Type 2, Type 3 and Type 4. Additionally, under rich condition, ZPGM catalyst samples prepared per coating process Type 3 may exhibit a slightly lower activity than activity achieved for fresh ZPGM catalyst samples prepared with other coating process, although under stoichiometric and lean condition ZPGM sample of Type 3 shows approximately similar $NO_X$ conversion as ZPGM catalyst sample of Type 1. Fresh ZPGM catalyst samples prepared per coating processes Type 4 shows better $NO_X$ conversion under all range of R-value than ZPGM catalyst sample prepared by coating process Type 2. As may be seen in FIG. 3 and FIG. 6, fresh ZPGM catalyst samples per coating process Type 1 achieved the lowest NO/CO cross over R-value of 1.10, followed by fresh ZPGM catalyst samples prepared per coating process Type 4, which achieved NO/CO cross over R-value of 1.19.

According to principles in present disclosure, use of different coating processes may bring about different effects on TWC performance as may observed from the results of the disclosed coating processes in example #1, example #2, example #3, and example #4. The introduction of more rigorous regulations are forcing catalyst manufacturers to device new technologies in order to ensure a high catalytic activity and effect of coating processes on TWC performance may need to be oriented toward continuously enhancing the level of conversion of toxic emissions.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

The invention claimed is:

1. A method of making a catalytic convertor, comprising:
   depositing at least one washcoat on a substrate;
   providing at least one first solution comprising Cu and Mn;
   providing at least one first slurry comprising $Nb_2O_5$—$ZrO_2$; and co-precipitating the at least one first solution and the at least one first slurry to form at least one precipitate over the at least one washcoat,
   wherein the at least one precipitate comprises Cu—Mn spinel; and wherein the Cu—Mn spinel has a general formula of $CuMn_2O_4$.

2. The method of claim 1, wherein the catalytic convertor is substantially free of platinum group metals.

3. The method of claim 1, wherein the substrate is ceramic.

4. The method of claim 1, wherein the at least one washcoat comprises alumina.

5. The method of claim 1, wherein the at least one first slurry is prepared by milling $Nb_2O_5$—$ZrO_2$ support oxide with water.

6. The method of claim 1, wherein the at least one first solution is prepared by mixing a solution of $Mn(NO_3)_2$ and a solution of $CuNO_3$.

7. The method of claim 6, wherein the at least one first solution comprises a molar ratio of $Mn(NO_3)_2$ to $CuNO_3$ is about 1:1.

8. The method of claim 1, wherein the at least one first solution and the at least one first slurry are mixed for about 2 hours to about 4 hours.

9. The method of claim 6, wherein the at least one first solution and the at least one first slurry are precipitated by the addition of a base solution to form the at least one precipitate.

10. The method of claim 9, wherein a second slurry comprising the at least one precipitate is coated on the washcoat layer and fired.

11. The method of claim 10, wherein the second slurry is fired at about 600° C.

12. The method of claim 10, wherein the second slurry is fired for about 5 hours.

13. The method of claim 4, further comprising milling alumina solution to make a third slurry.

14. The method of claim 13, further comprising coating the substrate with the third slurry and firing.

15. The method of claim 14, wherein the firing is at about 550° C.

16. The method of claim 14, wherein the firing is for about 4 hours.

17. The method of claim 1, wherein the at least one washcoat is loaded at about 120 g/L.

18. The method of claim 1, wherein the at least one precipitate is loaded over said washcoat at about 120 g/L.

19. The method of claim 9, wherein the at least one precipitate is loaded over said washcoat at about 120 g/L.

* * * * *